United States Patent Office 2,878,291
Patented Mar. 17, 1959

2,878,291

PROCESS FOR THE PREPARATION OF 4-HYDROXYSTILBENE AND ITS DERIVATIVES

Guido Cavallini and Elena Massarani, Milan, Italy assignors to Maggioni & C. S. p. A., Milan, Italy No Drawing. Application May 17, 1955
Serial No. 509,114

2 Claims. (Cl. 260—570)

A process for preparing 4-hydroxystilbene is described by Hewitt in Chem. Soc. J. 101 (1912) 604–5 but the yields obtained are not reported, and, in fact, the procedure described, when performed on a laboratory scale, has given very low yields, namely, of some 10% of theory.

It is an object of the present invention to provide a method for preparing 4-hydroxystilbene with yields much greater than those obtained with the method mentioned above.

It is another object of the present invention to provide methods for the preparation of derivatives of 4-hydroxystilbene, particularly, 4-hydroxy-4'-chloro-stilbene, 4-hydroxy-4'-nitro-stilbene and 4-hydroxy-4'-amino-stilbene, which also produce relatively high yields of such derivatives.

It has been surprisingly ascertained that, by adding piperidine to phenylacetic acid, there is a remarkable heat buildup: and this phenomenon indicates the formation of a piperidine salt of the phenylacetic acid.

Following the addition of piperidine to phenylacetic acid, p-hydroxybenzaldehyde is introduced, and the reaction mixture is heated at a temperature of 100° C. and under a vacuum (absolute pressure) of 16 mm.$_{Hg}$ for 3 hours. Subsequently the internal temperature is raised, still under the indicated reduced pressure, up to 150° C.: and a product is obtained which has a melting point 180° C.–182° C. with the yield of such product being 82%, in comparison with Hewitt's method which, as already pointed out, gives yields of approximately 10%.

It has also been unexpectedly ascertained that, when the operations set forth above are performed without employing vacuum, or when the operations are continued for different periods of time at steady temperatures within the range 100° C. to 180° C., the yields decrease to 10% and the product obtained has a melting point ranging from 153° C. to 170° C. The purity of this product, furthermore, is not satisfactory, as shown by the wide melting range, and consequently the product has to be further purified, so that the actual yield is even lower than the 10% mentioned above.

Referring to the foregoing, the basic steps of the method embodying the invention are the following:

(1) Introduction, in a reaction vessel, of piperidine and phenylacetic acid, at a temperature of not higher than 100 C., to form the piperidine salt of the phenylacetic acid.

(2) Introduction of p-hydroxybenzaldehyde and subsequent evacuation of the reaction vessel while maintaining the temperature at a value ranging from 90° C. to 100° C. for a predetermined time, for instance 3 hours. In this step condensation takes place between p-hydroxy benzaldehyde and phenylacetic acid, and the elimination of the water which is a consequence of this reaction, is facilitated by the application of vacuum.

(3) The temperature is raised to 150° C. while vacuum is still applied for a predetermined time, for intsance 3 hours, so that the elimination of $CO_2$ is speeded up and the reaction is thus completed in the least possible time.

By adopting the above described steps, a mass is obtained from which, when it is dissolved in an alkaline solution and subsequently neutralized, for intsance with $CO_2$, 4-hydroxystilbene, or a derivative thereof, is precipitated in crystallized form.

The 4-hydroxystilbene derivatives, substituted in 4' position, are similarly prepared, but the phenylacetic acid derivative then selected as a starting material is the one which contains, in the "para" position, the group which it is desired to introduce. Thus, for example, if 4-hydroxy-4'-nitrostilbene is to be produced, the starting material is p-nitro-phenylacetic acid, whereas, if 4-hydroxy-4'-chloro-stilbene is to be produced, the starting material is p-chlorophenylacetic acid.

The following specific examples will illustrate the method embodying this invention:

EXAMPLE I

*4-hydroxystilbene*

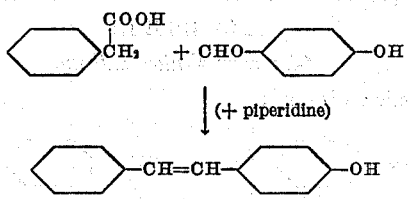

In a flask having three necks fitted with a cock-funnel, stirring means and thermometer, 40.8 grams of phenylacetic acid are introduced and 25.6 grams of piperidine are then added drop-by-drop while cooling flask in an oil bath in order to avoid an increase of the internal temperature above 100° C. After the introduction of the piperidine has been completed, the stirring is continued for an additional 10 minutes until the temperature falls to 50° C. 36.6 grams of p-hydroxy-benzaldehyde are now introduced.

The cock-funnel is replaced by a capillary tube, while the thermometer is replaced by a lateral tube connected to a reflux refrigerator and to a collecting flask fitted with an inlet tube. The whole system is indirectly heated at 100° C. and the flask is kept evacuated, while the liquid is stirred, for 3 hours.

After such 3 hour period the external temperature is raised to 150° C. for an additional 3 hours. A dark paste is formed in the flask and is transferred, while still hot, to a mortar. When cool, this mass sets and can be crushed. The product obtained is dissolved in 200 grams of a boiling 30% sodium hydroxide solution. The solution now obtained must be definitely alkaline when tested with phenolphthalein.

The solution is left to stand overnight at room temperature in order to obtain a slow crystallization forming crystals of a size sufficient for centrifugation. Then the solution is centrifuged and the sodium salt of 4-hydroxystilbene is dissolved in 3 litres of cold water. This solution is treated with 1 g. of animal charcoal and filtered.

A stream of carbon dioxide is bubbled through the filtrate until the alkaline reaction (indicator: phenolphthalein) disappears. A slightly yellow precipitate is obtained, which is centrifuged. The product is dried in an oven under vacuum at 50° C. Approximately 50 grams of 4-hydroxystilbene are obtained, which yield corresponds to 86% of the theoretical amount. The melting point is 184° C. to 186° C. The product has a satisfactory purity which is not improved by crystallizing it again from alcohol.

EXAMPLE II

*4-hydroxy-4'-chloro-stilbene*

Reaction diagram:

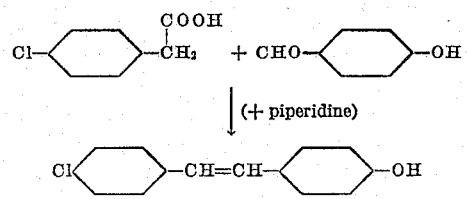

In a flask having three necks fitted with a cock-funnel, stirring means and thermometer, 51.15 grams of p-chlorophenylacetic acid are introduced and 25.6 grams of piperidine are added drop-by-drop while the flask is cooled in an oil bath in order to avoid that the internal temperature above 100° C. From this point onwards the procedure of the Example I is followed step by step, until a dark paste is obtained in the flask which is transferred, while still hot, to a mortar. This paste is allowed to set and then crushed, and thereafter there is extracted from said paste, through crystallization from glacial acetic acid, the 4- hydroxy-4'-chlorostilbene. 57.3 grams of 4-hydroxy-4'-chlorostilbene are obtained, which corresponds to 83% of the theoretical yield.

The product has a melting point of 182° C.

EXAMPLE III

*4-hydroxy-4'-nitro-stilbene*

Reaction diagram:

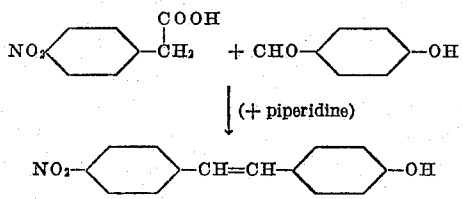

In a flask having three necks fitted with a cock-funnel, stirring means and thermometer, 54.3 grams of p-nitrophenylacetic acid are introduced and 25.6 grams of piperidine are added drop-by-drop while the flask is cooled in an oil-bath in order to avoid an increase in the internal temperature above 100° C.

From this point onwards the procedure of Example I is followed, step by step, until a dark paste is obtained in the flask which is transferred, while still hot, to a mortar, where it is allowed to set and then crushed. Then there is extracted from said paste, through crystallization from acetic acid, 4-hydroxy-4'-nitro-stilbene.

54 grams of 4-hydroxy-4'-nitro-stilbene are obtained, which correspond to 75% of the theoretical yield.

The melting point of the product is 204° C.

EXAMPLE IV

*4-hydroxy-4'-aminostilbene*

Reaction diagram:

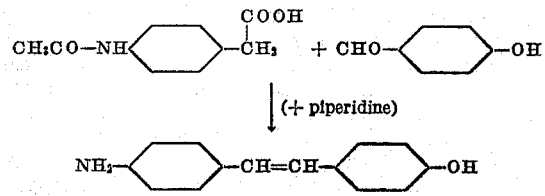

In a flask having three necks fitted with a cock-funnel, stirring means and thermometer, 57.9 grams of p-acetylaminophenylacetic acid are introduced and 25.6 grams of piperidine are added drop-by-drop while cooling the flask in order to avoid an increase of the internal temperature above 100° C. From this point onwards the procedure of Example I is followed, step by step, until a dark paste is obtained in the flask which is transferred, while still hot, to a mortar, where it is allowed to set and crushed. The product thus obtained is dissolved in about 200 grams of a boiling 30% solution of sodium hydroxide. The solution now obtained must give a definitely alkaline reaction with phenolphthalein. A stream of $CO_2$ is bubbled through the last mentioned solution until the alkaline reaction to phenolphthalein disappears. A light-yellow precipitate is obtained, which is centrifuged and dried in an oven, under vacuum, at 50° C.

50 grams of 4-hydroxy-4'-amino stilbene are obtained, which corresponds to 80% of the theoretical yield. The melting point of this product is 270° C.

The 4-hydroxystilbenes and the derivatives thereof which are prepared in accordance with this invention are useful intermediates in the preparation of synthetic hormones such as alkylaminopropyl derivatives described in copending patent application Serial No. 509,115, filed May 17, 1955, by the present applicants and now abandoned.

What we claim is:

1. A process for the preparation of members of the group consisting of 4-hydroxystilbene, 4-hydroxy-4'-chlorostilbene, 4-hydroxy-4'-nitro-stilbene and 4-hydroxy-4'-aminostilbene which comprises reacting piperidine and a member of the group consisting of phenylacetic acid and the derivatives thereof containing in the 4'-position a monovalent group which is selected from the class consisting of chloro, nitro and amino groups, in substantially equi-molecular proportions and controlling the temperature of the resulting exothermic reaction so that the temperature during said reaction will not exceed 100° C., then adding parahydroxybenzaldehyde in a substantially equi-molecular proportion to the phenylacetic acid and heating the reaction mixture at an absolute pressure of about 16 mm. of mercury and a temperature of 100 to 150° C. until the reaction ceases.

2. The process of claim 1 in which the reaction product is dissolved in strong hot alkali metal hydroxide solution filtered and decolorized and then neutralized with carbon dioxide until a precipitate is obtained, which is recovered.

References Cited in the file of this patent

Hewitt et al.: Chem. Soc. Journal, vol. 101 (1912), pp. 604–5.

J. Prakt Chem., vol. 152, pp. 237–66 (1937).

Brownlee et al.: Biochemical Journal, vol. 37 (1943), pp. 572–77.

Chemical Abstracts, vol. 48, 1954, page 2670b.

Journal of the Chemical Soc. London, vol. 101, p. 606 (Hewitt et al.).

Journal of the Chemical Soc. London, vol. 123, p. 2056 (Cullinare).